United States Patent [19]
Sugitani et al.

[11] Patent Number: 5,533,397
[45] Date of Patent: Jul. 9, 1996

[54] VIBRATION-SENSING ELEMENT AND VIBRATION-SENSING GYRO USING THE SAME

[75] Inventors: Nobuyoshi Sugitani, Toyota; Masayuki Okuwa, Nagoya; Takeshi Morikawa, Seto; Yutaka Nonomura, Nagoya, all of Japan

[73] Assignee: Toyota Jidosha Kabushiki Kaisha, Toyota, Japan

[21] Appl. No.: 329,385

[22] Filed: Oct. 26, 1994

[30] Foreign Application Priority Data

Oct. 28, 1993 [JP] Japan .................................. 5-294495

[51] Int. Cl.$^6$ .................................................. G01P 9/04
[52] U.S. Cl. .......................................................... 73/504.16
[58] Field of Search ........................... 73/504.16, 504.15, 73/504.14, 514.29; 310/321, 329

[56] References Cited

U.S. PATENT DOCUMENTS

| | | | |
|---|---|---|---|
| 5,166,571 | 11/1992 | Konno et al. | 73/504.16 |
| 5,216,315 | 6/1993 | Terada et al. | 73/504.16 |
| 5,343,749 | 9/1994 | Macy | 73/504.16 |

FOREIGN PATENT DOCUMENTS

| | | | |
|---|---|---|---|
| 4334736 | 4/1994 | Germany | 73/504.16 |
| 61-294311 | 12/1986 | Japan | 73/504.16 |
| 1-81514 | 5/1989 | Japan . | |
| 4-320922 | 11/1992 | Japan | 73/504.16 |

*Primary Examiner*—Hezron E. Williams
*Assistant Examiner*—Helen C. Kwok
*Attorney, Agent, or Firm*—Kenyon & Kenyon

[57] ABSTRACT

The invention provides a vibration-sensing gyro, where resonance frequencies of tines are adjusted adequately in a simple manner. A vibration-sensing gyro (10) of the invention is made of a light alloy plate like duralumin and includes a first tine (14) and a second tine (16) disposed parallel to each other and projecting from a base (12). When the first tine (14) has a length l1, a width w1 along the X axis, and a thickness t1 and the second tine (16) has a length l2, a width w2 along the X axis, and a thickness t2 (=t1), the first tine (14) and the second tine (16) hold the relationship of $l2/\sqrt{t2}=l1/\sqrt{w1}$. In other words, the tines (14,16) and the base (12) are manufactured to satisfy this relationship. Such definition of the dimensions makes a resonance frequency fx1 of the first tine along the X axis coincide with a resonance frequency fy2 of the second tine 16 along the Y axis.

23 Claims, 7 Drawing Sheets

VIBRATION-SENSING ELEMENT AND VIBRATION-SENSING GYRO USING THE SAME

BACKGROUND OF THE INVENTION

1. Field of the Invention

The present invention relates to a vibration-sensing element for supporting a first tine and a second tine to allow propagation of vibrations between the first and the second tines, where the first tine vibrates along an X axis of rectangular coordinate axis.

2. Description of the Related Art

Vibration-sensing elements having a pair of tines detect the angular velocity by making the tines vibrate along a predetermined axis.

In the following description, it is assumed that a tine vibrates along an X axis in the plane which contains rectangular coordinate axis (X-Y plane). When the tine vibrating along the X axis rotates around a Z axis perpendicular to the X-Y plane, the angular velocity generates the Coriolis force which acts on the tine along a Y axis. The Coriolis force depends upon the angular velocity. The angular velocity acting on the tine can be determined by measuring the Coriolis force indirectly as a displacement of the tine or directly using the piezoelectric effects of piezoelectric elements. A vibration-sensing gyro having a pair of tines as a tuning fork is disclosed in INTERNATIONAL LAYING-OPEN GAZETTE WO90/10196 whereas an H-shaped vibration-sensing element is specified in JAPANESE UTILITY MODEL LAYING-OPEN GAZETTE No. H-1-81514.

Such a vibration-sensing gyro is mounted on a vehicle to detect the yaw rate generated in turning the vehicle or to record the running conditions of the vehicle.

The vibration-sensing element proposed in INTERNATIONAL LAYING-OPEN GAZETTE WO90/10196 is composed of a quartz crystal, and excites vibrations (excited vibrations) of each tine by means of electrodes and detects vibrations (detected vibrations) of the tine with the electrodes. In this structure, a method of regulating the mass is proposed to make the resonance frequency of the excited vibrations of each tine coincide with the resonance frequency of the detected vibrations. A technique of such mass regulation is disclosed in JAPANESE UTILITY MODEL LAYING-OPEN GAZETTE No. H-1-81514. In this structure, each tine has an additional weight integrally formed therewith via a constricted portion. The additional weight is melted and removed according to the measurement of the resonance frequencies of the respective tines.

The mass regulation method described above requires measurement of the resonance frequencies simultaneously with fusion and removal of a specific weight while not allowing measurement of the specific weight melted and moved from the tine. In the conventional method, it is further required, based on the reasons described below, to make the resonance frequencies in the direction of the excited vibrations of the respective tines coincide with each other as well as to make those in the direction of the Coriolis force-induced vibrations or the detected vibrations coincide with each other. The adjustment of the resonance frequencies according to the conventional method accordingly requires a great deal of skill.

When the angular velocity-based Coriolis force is applied onto a tine in the direction of the Y axis while the tine vibrates in the direction of excitation, that is, along the X axis, the motion of the tine changes from unidirectional vibrations along the X axis to a rotational movement with distortion of the free end. Decomposition of the rotational movement into vectors of the X axis and the Y axis (perpendicular to the X axis) results in vibrations in the direction of excitation (excited vibrations) and vibrations in the direction of detection (detected vibrations). As for each tine, the frequency of the detected vibrations caused by the Coriolis force inevitably coincides with the frequency of the excited vibrations. As generally known, it is required to make the resonance frequency in the direction of the detected vibrations coincide with the resonance frequency in the direction of the excited vibrations in order to attain the maximum amplitude of the detected vibrations due to the Coriolis force. The greater amplitude of the detected vibrations and increase in the displacement of the tine are essential for the higher sensitivity of detection of the Coriolis force.

The conventional vibration-sensing element described above steadily excites vibrations (excited vibrations) of each tine along the X axis and detects the Coriolis force-based vibrations (detected vibrations) of the tine along the Y axis. This excitation and detection process is executed for the respective tines of the vibration-sensing element. In order to enhance the sensitivity of detection of the Coriolis force with the conventional vibration-sensing element, it is accordingly essential to make the resonance frequencies in the direction of the excited vibrations of the respective tines coincide with each other as well as to make those in the direction of the detected vibrations coincide with each other.

Each tine generally has a resonance frequency $fxi$ along the X axis and a resonance frequency $fyi$ along the Y axis, where i represents a corresponding tine number. The resonance frequencies $fxi$ and $fyi$ vary with the variation in the mass of the tine and the orientation of the mass variation. Adjustment of the resonance frequencies $fxi$ and $fyi$ by mass regulation should be repeated for all the tines included in the vibration-sensing element. This adjustment process requires much labor and time.

SUMMARY OF THE INVENTION

The object of the invention is to simplify the process of adjusting resonance frequencies of tines of a vibration-sensing element.

The above and the other related objects are realized by a vibration-sensing element comprising a base and first and second tines projecting from said base. The first and second tines are fixed to the base and arranged in a plane so that, while the first tine vibrates, the vibrations are propagated from the first tine to the second tine through the base.

The first tine is formed to have a width $w1$ along an X axis of rectangular coordinate axis and fixed to allow vibrations along the X axis. The second tine is formed to have a thickness $t2$, different from the width $w1$, along a Y axis perpendicular to the X axis, and fixed to allow vibrations along the Y axis. And a resonance frequency of the first tine along the X axis coincides with a resonance frequency of the second tine along the Y axis.

In the vibration-sensing element of the invention, the first tine is an excitation tine for continuously vibrating along the X axis with a fixed amplitude during operations of a sensor while the second tine is a detection tine for vibrating by application of an angular velocity and detecting the vibration outputs proportional to the angular velocity. The first tine and the second tine are independently prepared but connected with each other at respective one ends via the base.

The excitation resonance frequency is thus regulated by adjusting only the resonance frequency fx1 of the first tine along the X axis to a fixed frequency fd whereas the detection resonance frequency is regulated by adjusting only the resonance frequency fy2 of the second tine along the Y axis to a fixed frequency fs. Since both the tines are independently formed, the excitation resonance frequency fx1 and the detection resonance frequency fy2 can be adjusted in an independent manner with the first tine and with the second tine, respectively. This allows the excitation resonance frequency fx1 and the detection resonance frequency fy2 to be made identical with each other or approximate to each other in a predetermined range. The structure of the invention simplifies the conventionally-complicated process of adjusting resonance frequencies as explained below, thereby stabilizing and improving the sensing performance.

In the vibration-sensing element thus constructed, it is assumed that the first tine is a cantilever beam of a homogeneous cross-section having a width w1 along the X axis and a length l1, the measure from a fulcrum of vibrations along the X axis to a free end. The resonance frequency fx1 of vibrations of the first tine along the X axis is expressed as:

$$fx1 = (\lambda n^2/2\pi \cdot l1^2) \sqrt{E \cdot I \cdot g/A \cdot r} \quad (1)$$

wherein λn, E, I, g, A, and r, respectively, denote a frequency coefficient in an nth-order vibration mode, a modulus of direct elasticity, a geometrical moment of inertia, the acceleration of gravity, a sectional area, and a density. Since the geometrical moment of inertia I is equal to $t1 \cdot w1^3/12$ and the sectional area A is equal to $t1 \cdot w1$ (t1 is a thickness of the first tine), Equation (1) is rewritten as:

$$\begin{aligned} fx1 &= (\lambda n^2/2\pi \cdot l1^2)\sqrt{E \cdot (t1 \cdot w1^3/12) \cdot g/(t1 \cdot w1) \cdot r} \quad (2)\\ &= (\lambda n^2/2\pi \cdot l1^2)\sqrt{E \cdot w1^2 \cdot g/12 \cdot r}\\ &= (\lambda n^2 \cdot w1/2\pi \cdot l1^2)\sqrt{E \cdot g/12 \cdot r} \end{aligned}$$

It is, on the other hand, assumed that the second tine is a cantilever beam of a homogeneous cross-section having a thickness t2 along the Y axis and a length l2, the measure from a fulcrum of vibrations along the Y axis to a free end. The resonance frequency fy2 of vibrations of the second tine along the Y axis is expressed as:

$$fy2 = (\lambda n^2/2\pi \cdot l2^2)\sqrt{E \cdot I \cdot g/A \cdot r} \quad (3)$$

wherein λn, E, I, g, A, and r denote the same as Equation (1) shown above. Since the geometrical moment of inertia I is equal to $w2 \cdot t2^3/12$ and the sectional area A is equal to $w2 \cdot t2$ (w2 is a width of the second tine ), Equation (3) is rewritten as:

$$\begin{aligned} fy2 &= (\lambda n^2/2\pi \cdot l2^2)\sqrt{E \cdot (w2 \cdot t2^3/12) \cdot g/(w2 \cdot t2) \cdot r} \quad (4)\\ &= (\lambda n^2/2\pi \cdot l2^2)\sqrt{E \cdot t2^2 \cdot g/12 \cdot r}\\ &= (\lambda n^2 \cdot t2/2\pi \cdot l2^2)\sqrt{E \cdot g/12 \cdot r} \end{aligned}$$

In the structure of the invention, the value of a ratio ($\sqrt{w1}/l1$) of the square root of the width w1 of the first tine to the length l1 of the first tine coincides with the value of a ratio ($\sqrt{t2}/l2$) of the square root of the thickness t2 of the second tine to the length l2 of the second tine, which is written as:

$$\sqrt{w1}/l1 = \sqrt{t2}/l2 \quad (5)$$

Raising both sides of Equation (5) to the second power and rewriting results in Equation (6) shown below:

$$w1/l1^2 = t2/l2^2 \quad (6)$$

Substitution of Equation (6) into Equation (2) gives the resonance frequency fx1 of the first tine defined as:

$$fx1 = (\lambda n^2 \cdot t2/2\pi \cdot l2^2)\sqrt{E \cdot g/12 \cdot r} = fy2$$

This means that the resonance frequency fx1 of the first tine coincides with the resonance frequency fy2 of the second tine. When an angular velocity around a Z axis perpendicular to the rectangular coordinate axis acts on the first tine steadily vibrating along the X axis, the first tine receives the Coriolis force along the Y axis and is excited to vibrate along the Y axis. The first tine vibrates along the Y axis at an angular velocity frequency fyω1, which coincides with the resonance frequency fx1 of the first tine along the X axis.

The vibrations of the first tine along the Y axis are propagated to the second tine, which accordingly vibrates along the Y axis. The resonance frequency fy2 of vibrations of the second tine along the Y axis is identical with the resonance frequency fx1 of the first tine along the X axis as described previously and thereby with the angular velocity frequency fyω1 of the first tine.

The resonance frequency fy2 of the second tine can be made equal to the resonance frequency fx1 of the first tine and then to the angular velocity frequency fyω1 of the first tine by forming the first and the second tines to satisfy Equation (5). The second tine is sympathetic with the angular velocity-based vibrations so as to vibrate along the Y axis with a large amplitude. This increases the displacement of the second tine and accordingly enhances the sensitivity of detection of the Coriolis force.

The essential points of the invention are that the width w1 of the first tine should be different from the thickness t2 of the second tine and that the value of the ratio of the first tine $\sqrt{w1}/l1$ should be equal to the value of the ratio of the second tine $\sqrt{t2}/l2$. The values of l1, l2, w1 , w2, t1, and t2 in Equations (1) through (4) are specified to satisfy the above relations and l1≠l2, w1≠w2, and t1≠t2. The dimensions (length l, width w, and thickness t) of the excitation tine are accordingly made different from those of the detection tine. The resonance frequencies of each tine along the X axis and the Y axis are set independently of each other. The excitation resonance frequency fd of the first tine is made identical with fx1 but different from fy1 whereas the detection resonance frequency fs of the second tine is made identical with fy2 and fx1 but different from fx2.

This process sets the resonance frequencies fx1 and fy1 of the first tine, which is excitation tine, sufficiently apart from each other to prevent adverse effects of fy1 on the sensor. This also sets the resonance frequencies fx2 and fy2 of the first tine, which is detection tine, sufficiently apart from each other to prevent adverse effects of fx2 on the sensor. The structure of the invention requires measurement and regulation of only the resonance frequencies fx1 and fy2 for adjustment of fd and fs, thereby realizing a simplified adjustment process. Distinct differences of fx2 and fy1 from fx1 and fy2 ensure the simple and independent adjustment.

The easily-measurable width, thickness, and length of each tine are specified and adjusted to satisfy the relation defined as Equation (5) through cutting, grinding, and other appropriate machine-working processes or a known thin-film forming process like vacuum evaporation, spattering, and CVD (chemical vapor deposition). While the resonance frequency fx1 of the first tine is made identical with the resonance frequency fy2 of the second tine, no specific adjustment is required to make the resonance frequency fx2 of the second tine coincide with the resonance frequency fx1 of the first tine.

The resonance frequency fx1 of the first tine and the resonance frequency fy2 of the second tine are made identical with each other irrespective of the width w2 of the second tine along the X axis and the thickness t1 of the first tine along the Y axis. The resonance frequency fx2 of the second tine can thus be made equal to an antiresonance frequency fxγ1 of the first tine along the X axis by appropriately specifying the width w2 of the second tine along the X axis and the thickness t1 of the first tine along the Y axis. This effectively suppresses vibrations of the second tine along the X axis, which are propagated from vibrations of the first tine along the X axis, and realizes substantially unidirectional vibrations of the second tine along the Y axis. The structure of the invention preferably eliminates adverse effects of vibrations of the second tine along the X axis which may disturb detection of the Coriolis force on the second tine, thereby enhancing the sensitivity of detection of the Coriolis force.

The tines of the vibration-sensing element may be made of any material as long as vibrations of the first tine along the Y axis can be propagated to the second tine. Examples of the vibration-propagating material include metals, crystals like quartz crystal and semiconductors, glass, and ceramics.

The yaw rate of the vibration-sensing element is detected as vibrations of the second tine along the Y axis while the first tine continuously vibrates along the X axis. This structure allows vibrations of the first tine along the Y axis due to the Coriolis force to be propagated to the second tine, which vibrates sympathetically along the Y axis. When the vibration-sensing gyro rotates around the Z axis perpendicular to the X-Y plane, the angular velocity-based Coriolis force vibrates the first tine, which is subsequently propagated to the second tine. The resultant vibrations of the second tine along the Y axis are then detected for calculation of the yaw rate. Since the resonance frequency fx1 of the first tine coincides with the resonance frequency fy2 of the second tine, the Coriolis force vibrates the second tine along the Y axis with a large amplitude. This increases a displacement of the second tine and thereby enhances the sensitivity of detection of the Coriolis force.

A desirable structure is selected according to the material of the tines to realize continuous vibrations of the first tine along the X axis. For example, the tines made of a metal, crystal like quartz crystal or semiconductor, glass, or ceramics are vibrated by reverse piezoelectric effects of piezoelectric elements (PZT). When the tines are made of a material having piezoelectric effects, for example, ceramics or crystal like quartz crystal or semiconductor, electrodes are applied to vibrate the tines through the reverse piezoelectric effects of the tines. Another preferable structure vibrates the tines by varying the induced magnetic force or the capacity charge acting on the tines. Vibrations of the second tine along the Y axis are detected by means of the piezoelectric effects of piezoelectric elements or electrodes or as a variation in the induced magnetic force or capacity charge.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
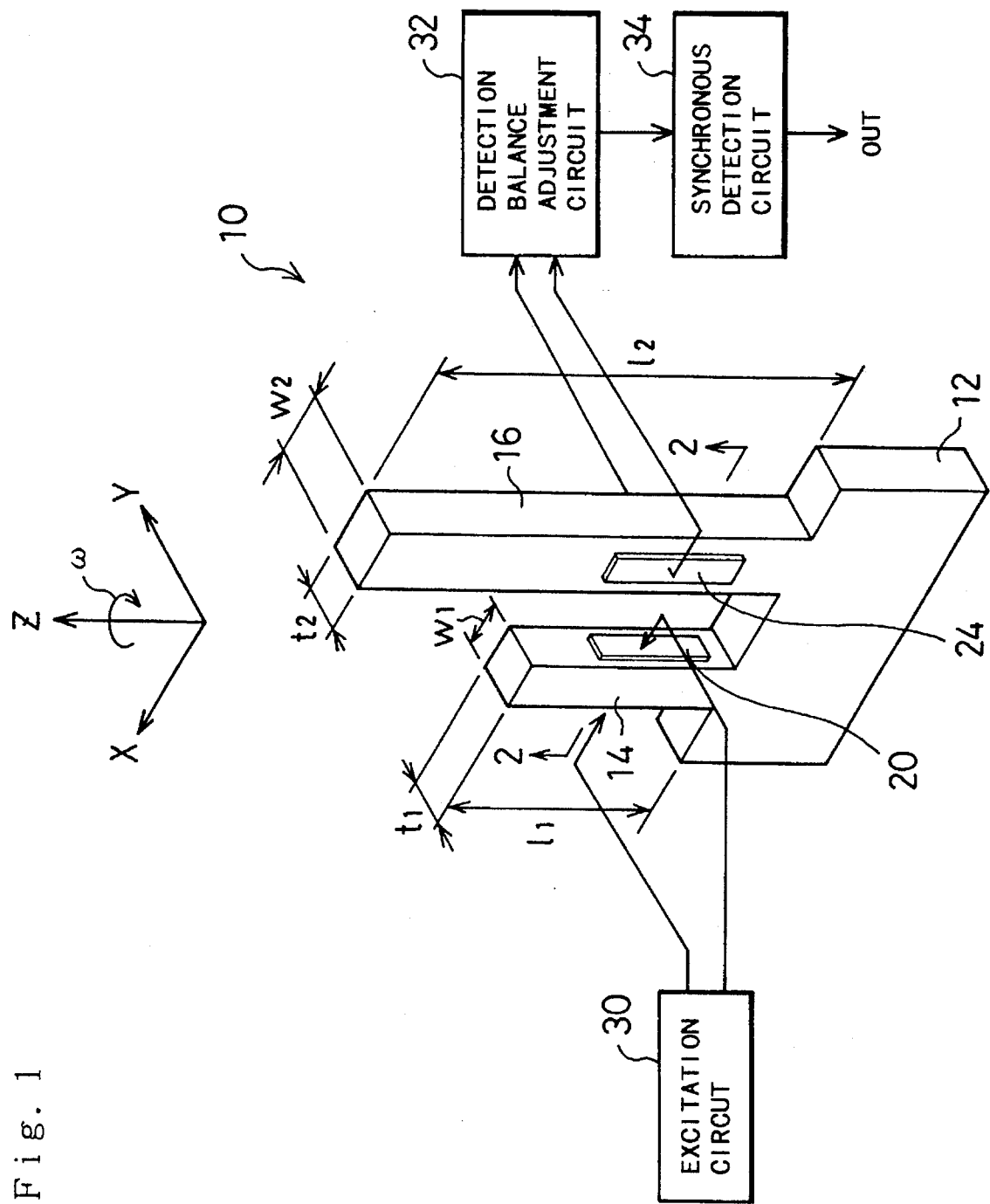
FIG. 1 is a perspective view illustrating a vibration-sensing gyro 10 embodying the invention.

A typical vibration-sensing gyro embodying the present invention is described with reference to the accompanying drawings. FIG. 1 is a perspective view illustrating a vibration-sensing gyro 10 embodying the invention. The vibration-sensing gyro 10 includes a base 12 and first and second tines 14 and 16 projecting parallel to each other from the base 12. The vibration-sensing gyro 10 is manufactured by machine-working a vibration-propagating metal plate, typically a light alloy such as duralumin, to the specific shape shown in FIG. 1. Dimensions (length, width, and thickness) of the first and the second tines 14 and 16 will be described later.

Figure 2:
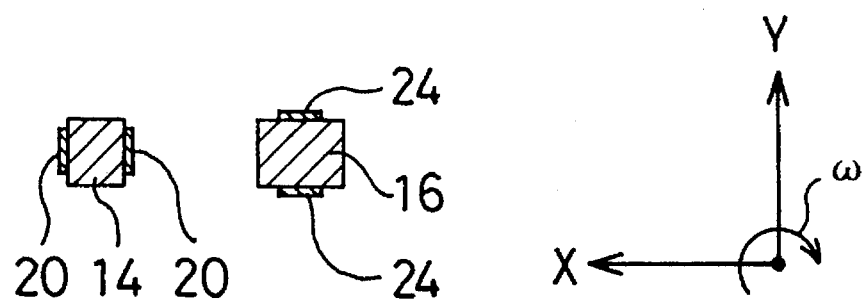
FIG. 2 is a cross-sectional view taken on the line 2—2 of FIG. 1.

As shown in FIG. 1 and FIG. 2, which is a cross-sectional view taken on the line 2—2 of FIG. 1, each tine 14 or 16 has a pair of piezoelectric elements adhering and fixed thereto. The first tine 14 has a pair of piezoelectric elements 20 adhering and fixed to the side faces thereof (faces parallel to the Y-Z plane perpendicular to the X axis) whereas the second tine 16 has a pair of piezoelectric elements 24 adhering and fixed to the upper and lower faces thereof (faces parallel to the X-Z plane perpendicular to the Y axis). Each pair of piezoelectric elements 20 or 24 arranged opposite to each other are wired in a specific manner to prevent a conductive line (not shown) used for application of an ac voltage to the respective piezoelectric elements from interfering with vibrations of each tine. And each pair of piezoelectric elements 20 or 24 are fixed at between zero and 50 percent of each respective tine length of the first tine 14 and the second tine 16 from the base 12.

In the vibration-sensing gyro 10 thus constructed, the first tine 14 is excited and vibrated continuously along the X axis by means of the pair of piezoelectric elements 20. The piezoelectric elements 20 on the first tine 14 respectively receive ac (alternating current) voltages applied from an excitation circuit 30 to expand and contract according to the applied voltage by reverse piezoelectric effects. The ac voltages applied have a frequency identical to a resonance frequency fx1 of the first tine 14 along the X axis and phases different from each other by 180 degrees. Since the ac voltages applied to the piezoelectric elements 20 have phases different from each other by 180 degrees, one piezoelectric element 20 expands while the other piezoelectric element 20 contracts and vice versa. The first tine 14 accordingly vibrates along the X axis at the resonance frequency fx1 by means of the pair of piezoelectric elements 20 adhering thereto.

The pair of piezoelectric elements 24 adhering to the second tine 16 expand and contract with vibrations of the second tine 16 along the Y axis. The piezoelectric elements 24 then generate electric signals of ac voltages according to the expansion and contraction of the elements 24 or according to the amplitude of vibrations of the second tine 16 along the Y axis by piezoelectric effects. Since one piezoelectric element 24 expands while the other element 24 contracts, the electric signals thus generated are ac voltages having phases different from each other by 180 degrees. A detection balance adjustment circuit 32 receives the electric signals and inverts one of the electric signals to make the phases identical to each other. The vibration-sensing gyro 10 eventually generates linear output signals corresponding to the amplitude of vibrations of the second tine 16 along the Y axis via a synchronous detection circuit 34. The synchronous detection circuit 34 inverts negative portions of the ac voltages to positive voltages for rectification. The vibration-sensing gyro 10 mounted on a vehicle in such a manner that the X-Y plane of the gyro coincides with the plane formed by the longitudinal axis of the vehicle and the lateral axis of the vehicle can detect the turning direction and angle of the vehicle.

The first tine 14 and the second tine 16 have dimensions described below. The dimensions include a length, a measure from a fulcrum of vibrations to a free end or a length projected from the base 12, a width, and a thickness. As shown in FIG. 1, the first tine 14 has a length l1, a width w1 along the X axis, and a thickness t1 whereas the second tine 16 has a length l2, a width w2 along the X axis, and a thickness t2 (=t1). The first tine 14 and the second tine 16 having the above dimensions hold the following relationship:

$$l2 = \sqrt{t2/w1} \ l1 \quad (7)$$

Equation (7) is rewritten as:

$$l2/\sqrt{t2} = l1/\sqrt{w1} \quad (8)$$

Raising both sides of Equation (8) to the second power and rewriting results in Equation (6) shown above:

$$w1/l1^2 = t2/l2^2 \quad (6)$$

This means that the first tine 14 and the second tine 16 are cantilever beams of homogeneous cross-sections as shown in FIGS. 1 and 2 and have the relationship expressed as Equation (6). In the vibration-sensing gyro 10 of the embodiment, the resonance frequency fx1 of the first tine 14 along the X axis accordingly coincides with a resonance frequency fy2 of the second tine 16 along the Y axis (fx1=fy2). In Equations (6), (7), and (8), only the lengths, width, and thickness of the first tine 14 and the second tine 16 are variables whereas other conditions like masses of the tines are fixed. The lengths, width, and thickness of the tines 14 and 16 satisfying Equation (6) are defined in the process of design of the vibration-sensing gyro 10. The thickness t1 of the first tine 14 and the width w2 of the second tine 16 along the X axis are not addressed in Equation (6) and are determined arbitrarily in the process of design of the vibration-sensing gyro 10. In any process of design and manufacture, it is not required to make the resonance frequency fx1 of the first tine 14 coincide with a resonance frequency fx2 of the second tine 16 along the X axis.

In this embodiment, a resonance frequency fy1 of the first tine 14 along the Y axis is set not equal to the resonance frequency fx1 of the first tine 14 along the X axis but sufficiently higher than fx1. Since fx1 is set equal to fy2, the four resonance frequencies of the tines 14 and 16 have the following relationships:

$$fx1 = fy2 < fy1$$

$$fx1 = fy2 < fx2$$

The settings of the resonance frequencies allow fx1 and fx2 to be adjusted independently of each other and thus prevent undesirable variations due to combination with fx2 or fy1. The resonance frequencies fx1 and fy2 are accordingly made equal to each other by adjusting only one resonance frequency, for example, fy2. Adjustment of fy2 is implemented readily by regulating the rigidity of part of the detection tine or the second tine 16 regarding vibrations of the tine 16 along the Y axis or by locally regulating the mass of the second tine 16. Although regulation of the rigidity or the mass also changes the resonance frequency fx2 of the second tine 16 along the X axis, the variation in fx2 does not substantially affect the sensing performance in the system of the embodiment. Since the first tine 14 and the second tine 16 are independent of each other and fx1 and fy1 are sufficiently apart from fx2 and fy2, respectively, adjustment of fy2 does not vary the resonance frequency fx1.

The concrete dimensions of the vibration-sensing gyro 10 of the embodiment are given below. The drawing of FIG. 1 exaggerates the difference in dimensions.

(A) first tine 14 length l1=40 mm, width w1=2.8 mm, thickness t1=3 mm (B) second tine 16 length l2=41.4 mm, width w2=4 mm, thickness t2=3 mm Substitution of these values of the first tine 14 and the second tine 16 in Equation (8) gives the right side (l1/$\sqrt{w1}$) as 40/$\sqrt{2.8}$=23.905 and the left side (l2/$\sqrt{t2}$) as 41.1/$\sqrt{3}$=23.902. The value of the right side is in good agreement with that of the left side. This means that Equation (8) can be applied both ideally and practically.

When an angular velocity ω around a Z axis perpendicular to the rectangular coordinate axis acts on the vibration-sensing gyro 10 including the first tine 14 and the second tine 16 of the above relationship, the first tine 14 steadily vibrating at the resonance frequency fx1 receives the Coriolis force in the direction of the Y axis and vibrates along the Y axis. The first tine 14 vibrates along the Y axis at an angular velocity frequency fyω1 identical with the resonance frequency fx1 (fx1=fyω1).

The vibrations of the first tine 14 along the Y axis are propagated to the second tine 16 via the base 12 to vibrate the second tine 16 along the Y axis. The resonance frequency fy2 of the vibrations of the second tine 16 along the Y axis coincides with the resonance frequency fx1 of the first tine 14 as described previously and is thereby equal to the angular velocity frequency fyω1 of the first tine 14. The second tine 16 accordingly vibrates along the Y axis at the resonance frequency fy2, which is identical with the angular velocity frequency fyω1 at which the first tine 14 receiving the Coriolis force vibrates along the Y axis. The vibrations of the second tine 16 along the Y axis are converted to electric signals by the piezoelectric elements 24 and output outside.

As described above, the resonance frequency fy2 of the second tine 16 used for detection is made equal to the resonance frequency fx1 of the first tine 14 simply by specifying the dimensions (lengths, widths, and thicknesses) of the first tine 14 and the second tine 16 in the process of design to satisfy the relationships of Equations (7) and (8) or Equation (6) and manufacturing the first tine 14 and the second tine 16 according to the specified dimensions. The vibration-sensing gyro 10 of the embodiment is made of a light alloy like duralumin. The resonance frequency fy2 of the second tine 16 is made identical with the resonance frequencies fx1 and fy1 of the first tine 14 by machining and grinding the first tine 14 and the second tine 16 with electric sparks or an end mill. The widths and the thicknesses of the first tine 14 and the second tine 16 are easily adjusted by known thin-film forming process like vacuum evaporation, spattering, and CVD (chemical vapor deposition).

In the vibration-sensing gyro 10 of the embodiment, the resonance frequencies of the respective tines are adjusted simply by specifying the easily-measurable lengths, widths, and thicknesses of the tines in the process of design and manufacturing the tines according to the specified dimensions. Namely, the structure of the vibration-sensing gyro 10 effectively simplifies the process of adjusting the resonance frequencies of the respective tines. The structure of the embodiment does not require adjustment of the resonance frequency fx2 of the second tine 16 to be made identical with the resonance frequency fx1 of the first tine 14, thereby saving the time and labor required for the adjustment of the resonance frequencies. The vibration-sensing gyro 10 can be manufactured simply by working a single plate.

The first tine 14 steadily vibrates along the X axis by the function of the piezoelectric elements 20. When the angular velocity ω around the Z axis acts on the vibration-sensing gyro 10, the first tine 14 receives the Coriolis force corresponding to the angular velocity ω and vibrates along the Y axis. The vibrations of the first tine 14 along the Y axis caused by the Coriolis force are propagated to the second tine 16 via the base 12. The second tine 16 then vibrates sympathetically along the Y axis at the resonance frequency fy2, which is equal to the resonance frequency fx1 of the first tine 14 along the X axis and thereby the angular velocity frequency fyω1 of the first tine 14 along the Y axis. The large amplitude of the Coriolis force-based vibrations of the second tine 16 along the Y axis increases the displacement of the second tine 16. The vibration-sensing gyro 10 of the embodiment can accordingly detect the Coriolis force with high sensitivity through simple adjustment of the resonance frequencies or masses.

The resonance frequency fx1 of the first tine 14 is made identical with the resonance frequency fy2 of the second tine 16 irrespective of the width w2 of the second tine 16 and the thickness t1 of the first tine 14. The vibration-sensing gyro 10 is made of a single plate, and the thickness t1 of the first tine 14 is automatically determined by the thickness of the plate. The resonance frequency fx1 of the first tine 14 and the resonance frequency fy2 of the second tine 16 are thus made equal to each other regardless of the width w2 of the second tine 16. In the vibration-sensing gyro 10 of the embodiment, the width w2 of the second tine 16 is set equal to 4 mm. The resonance frequency fx2 of the second tine 16 along the X axis defined by the width w2 and the length l2 accordingly does not coincide with the resonance frequency fx1 of the first tine 14 along the X axis.

The vibrations of the first tine 14 along the X axis propagated to the second tine 16 accordingly do not resonate the second tine 16 in the direction of the X axis. This feature of the vibration-sensing gyro 10 effectively prevents vibrations of the second tine 16 along the X axis and makes vibrations of the second tine 16 close to unidirectional vibrations along the Y axis. The structure of the embodiment preferably eliminates adverse effects of vibrations of the second tine 16 along the X axis which may disturb detection of the Coriolis force on the second tine 16, thereby enhancing the sensitivity of detection of the Coriolis force. According to a preferable structure, the width w2 of the second tine 16, which can be set arbitrarily, is determined to make the resonance frequency fx2 of the second tine 16 along the X axis coincide with an antiresonance frequency of the first tine 14 along the X axis. This further eliminates vibrations of the second tine 16 along the X axis and realizes substantially unidirectional vibrations of the second tine 16 along the Y axis.

In the vibration-sensing gyro 10 of the embodiment, each tine has a pair of piezoelectric elements used for a single purpose, that is, for excitation or for detection. While the first tine 14 has the piezoelectric elements 20 for vibrating the first tine 14 along the X axis, the second tine 16 has the piezoelectric elements 24 for detecting vibrations of the second tine 16 along the Y axis. Application of the single-purpose piezoelectric elements to each tine simplifies and down-sizes the structure of the vibration-sensing gyro 10.

The piezoelectric elements are disposed on the root of each tine, which is exposed to a large distortion due to vibrations. In the vibration-sensing gyro 10 of the embodiment, the piezoelectric elements 20 efficiently vibrate the first tine 14 whereas the piezoelectric elements 24 on the second tine 16 detect the Coriolis force and the direction and magnitude (yaw rate) of the angular velocity ω with high sensitivity. The piezoelectric elements are preferably disposed closer to the base rather than on the center of each tine.

Figure 3:
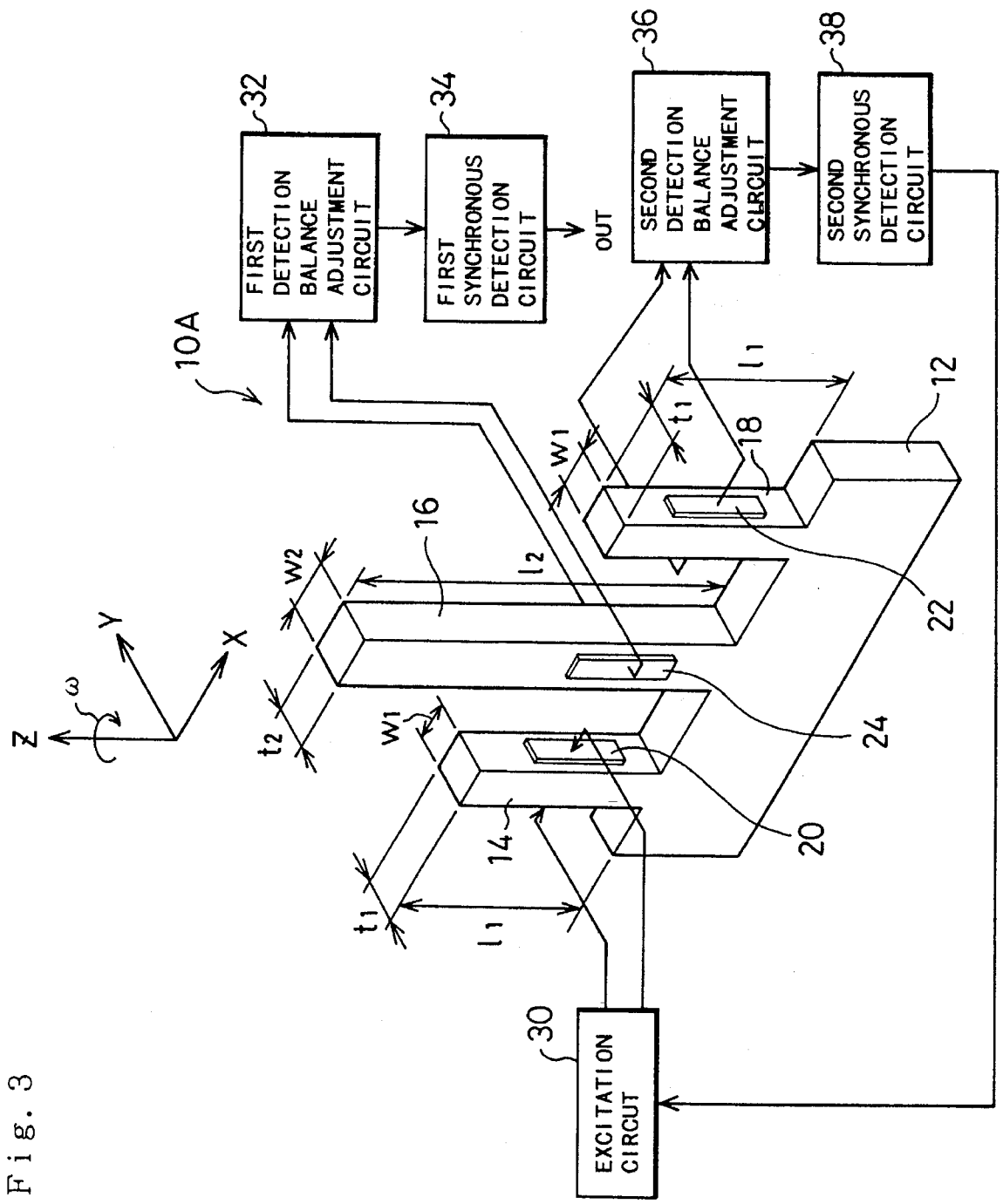
FIG. 3 is a perspective view showing a modification of the vibration-sensing gyro 10A.

Examples of possible modifications of the vibration-sensing gyro 10 are given below. First modification includes a third tine 18 added to the structure of the vibration-sensing gyro 10 of the above embodiment. As shown in FIG. 3, a modified vibration-sensing gyro 10A has a third tine 18 projecting from the base 12 to be arranged parallel to the first tine 14 and the second tine 16. The third tine 18 has the width and the length identical with those of the first tine 14 and is provided with a pair of piezoelectric elements 22 arranged in the same manner as the first tine 14.

In the modified vibration-sensing gyro 10A, the first tine 14 steadily vibrates along the X axis drawn in FIG. 3 by the function of the piezoelectric elements 20. The vibrations of the first tine 14 along the X axis are propagated to the third tine 18, which continuously vibrates along the X axis. The third tine 18 having the same dimensions as those of the first tine 14 vibrates at a resonance frequency fx3, which is virtually identical with the resonance frequency fx1 of the first tine 14. The vibrations of the third tine 18 along the X axis are converted to electric signals or ac voltages by piezoelectric effects of the piezoelectric elements 22 and output via a second detection balance adjustment circuit 36 and a second synchronous detection circuit 38.

The vibration-sensing gyro 10A attains the same effects as the vibration-sensing gyro 10 described above and detects vibrations of the third tine 18 propagated from the first tine 14. The vibration-sensing gyro 10A keeps the amplitude of vibrations of the first tine 14 along the X axis substantially constant through feed-back control of the ac voltages applied to the piezoelectric elements 20 based on the vibrations of the third tine 18, thus further improving the sensitivity of detection of the Coriolis force. The vibration-sensing gyro 10A accordingly has stable properties including thermodynamic properties. The vibration-sensing gyro 10A having such advantages is also manufactured simply by working a single plate.

Figure 4:
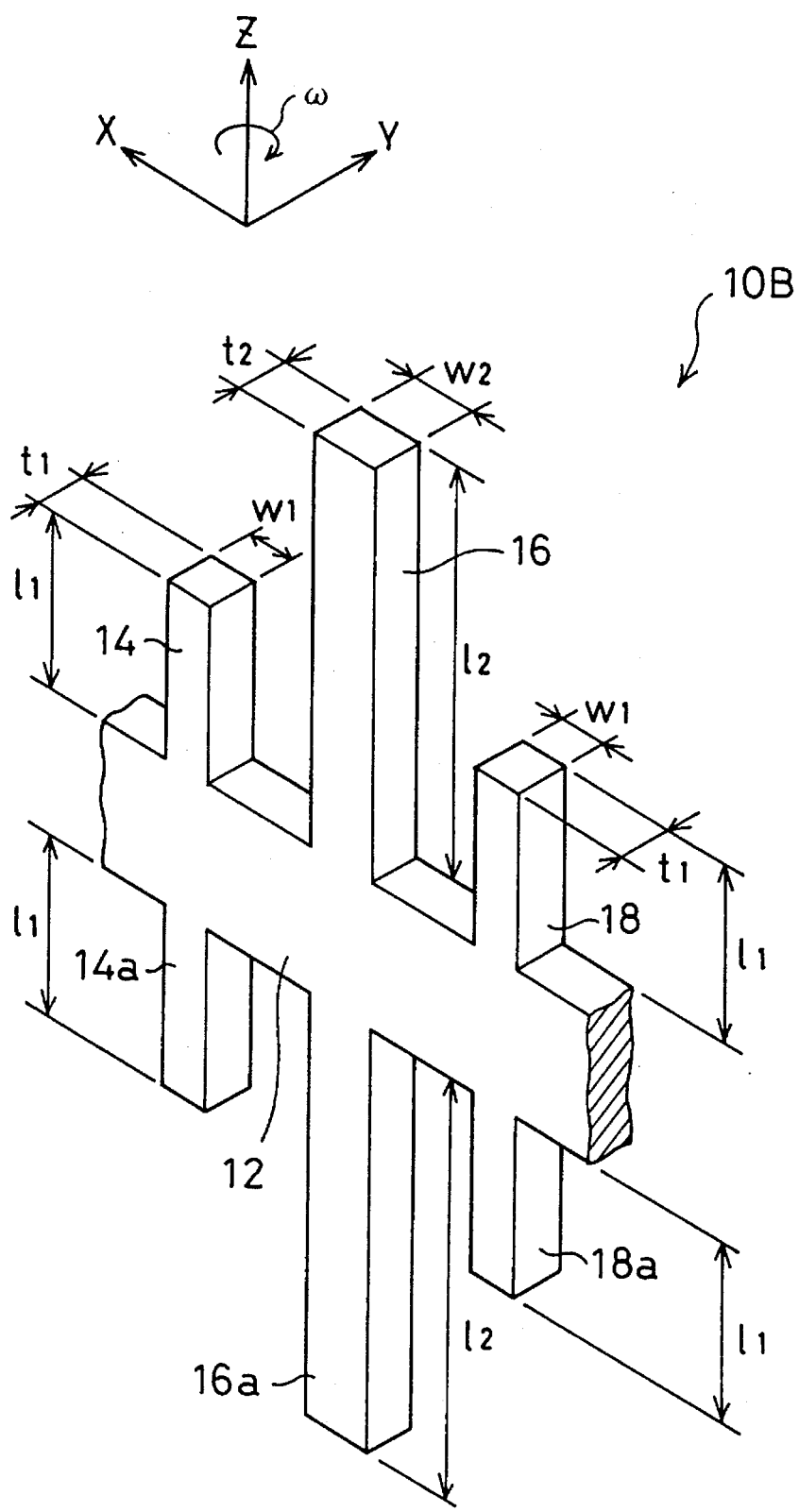
FIG. 4 is a perspective view showing another modification of the vibration-sensing gyro 10B.

According to another modification, a vibration-sensing gyro 10B includes a first tine 14, a second tine 16, and a third tine 18 projecting upward from a base 12 as well as a fourth tine 14a, a fifth tine 16a, and a sixth tine 18a projecting downward from the base 12, as shown in FIG. 4. The first tine 14 and the fourth tine 14a, the second tine 16 and the fifth tine 16a, and the third tine 18 and the sixth tine 18a are respectively opposed to each other across the base 12. The lengths, widths, and thicknesses of the fourth tine 14a and the fifth tine 16a are determined to satisfy Equations (7) and (8) or Equation (6) like the first tine 14 and the second tine 16. The sixth tine 18a has the same length, width, and thickness as those of the first tine 14.

Figure 5:
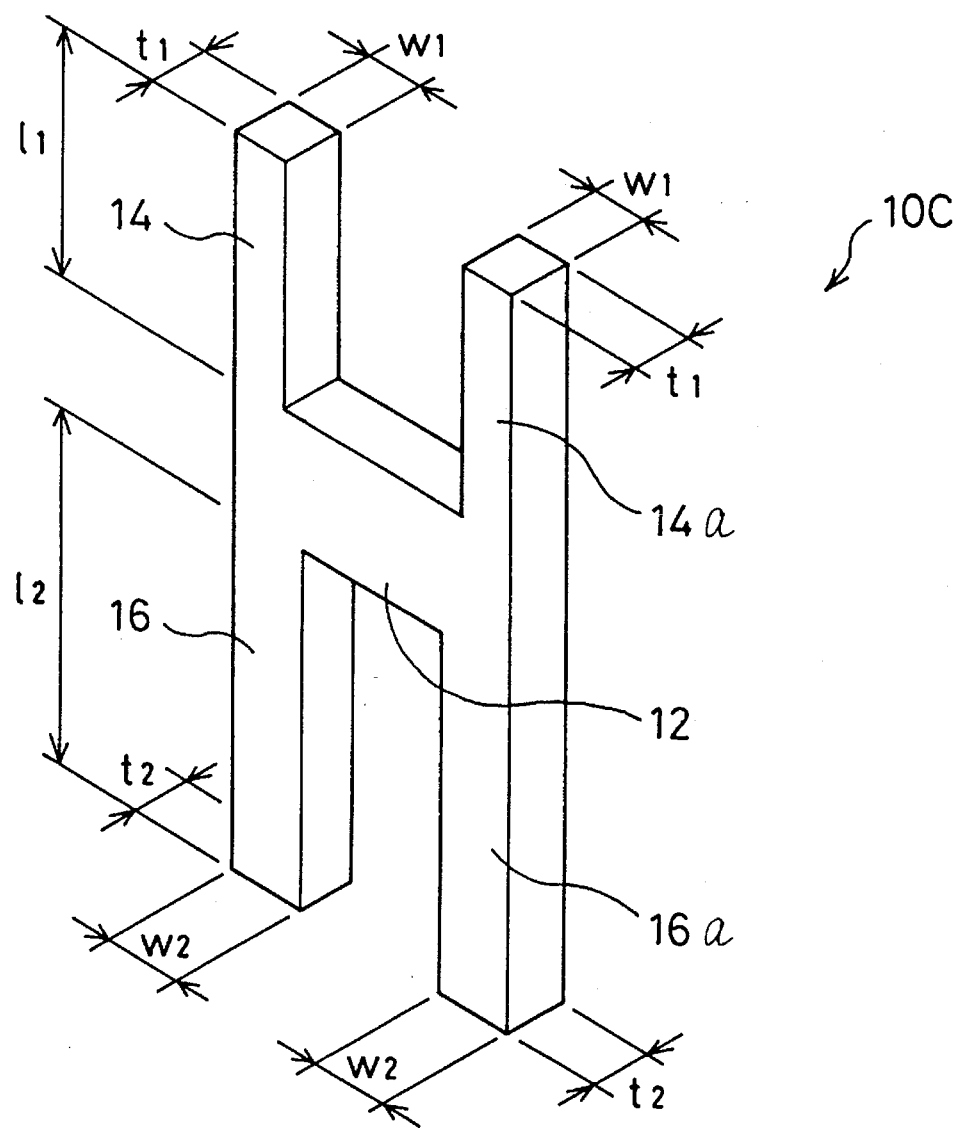
FIG. 5 is a perspective view showing still another modification of the vibration-sensing gyro 10C.

An example of still another modification is an H-shaped vibration-sensing gyro 10C shown in FIG. 5 having first and third tines 14 and 14a projecting parallel to each other from the base 12 in a first direction, and second and forth tines 16 and 16a projecting parallel to each other from the base 12 in a second direction which is opposite to the first direction.

Figure 6:
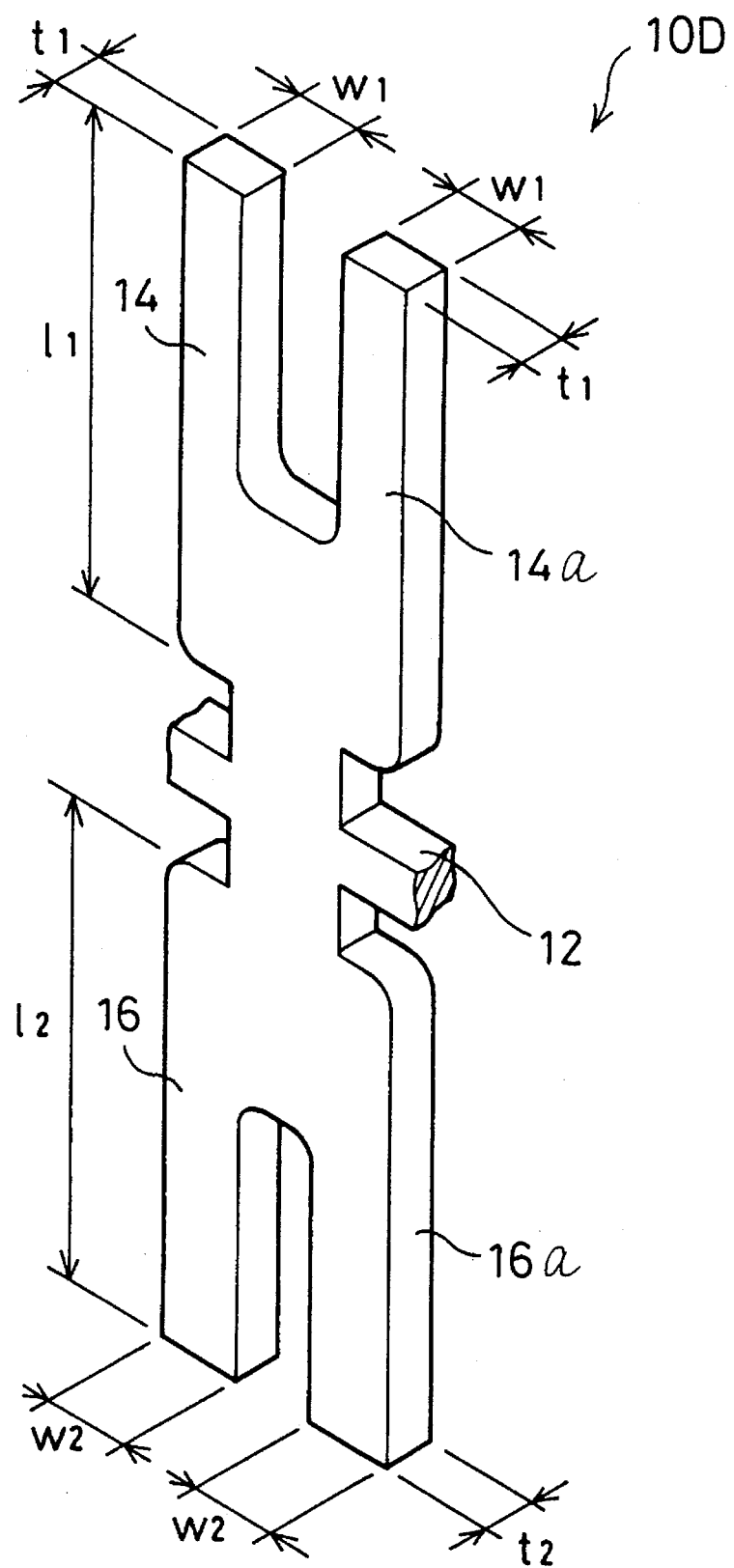
FIG. 6 is a perspective view showing another modification of the vibration-sensing gyro 10D.
Figure 7:
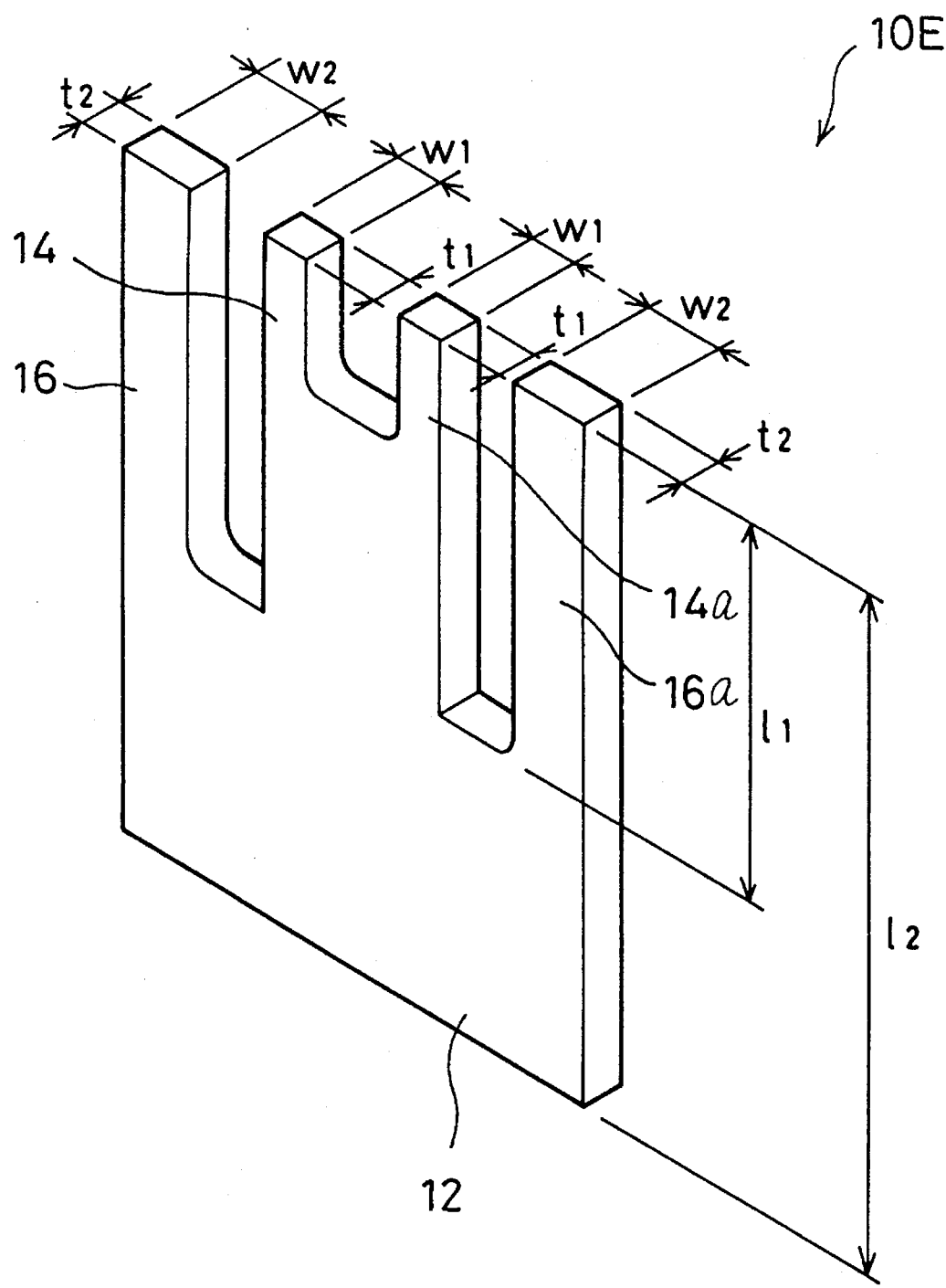
FIG. 7 is a perspective view showing still another modification of the vibration-sensing gyro 10E.

Other examples include vibration-sensing gyro 10D and 10E having a first tuning fork consisting of first and third tines 14 and 14a and a second tuning fork consisting of second and forth tines 16 and 16a, which are joined with each other via a base 12, as shown in FIGS. 6 and 7. The vibration-sensing gyro 10D shown in FIG. 6 includes a first tuning fork projecting from the base 12 in a first direction, and a second tuning fork projecting from the base 12 in a second direction which is opposite to the first direction. The vibration-sensing gyro 10E shown in FIG. 7 includes the first tuning fork affixed to a bifurcated base of the second tuning fork.

In the H-shaped vibration-sensing gyro 10C, the first and third tines 14 and 14a are used for excitation whereas the second and forth tines 16 and 16a are used for detecting the angular velocity. The first tine 14 is used for generating vibrations along the X axis by excitation means, for example, a pair of piezoelectric elements 20 for detection of the angular velocity, and the third tine 14a is used for harmonic vibrations or feed-back control.

The third tine 14a for harmonic vibrations has a function of generating vibrations along the X axis and vibrates harmonically with vibrations of the first tine 14 by excitation means, for example, a pair of piezoelectric elements 20. Vibrations of the first and third tines 14 and 14a long the X axis may be set in an equiphase or in an antiphase by making the phase of the driving ac voltage for the harmonic vibration tine different from the phase of the driving ac voltage for the other excitation tine. The third tine 14a for harmonic vibrations controls the vibration mode of the H-shaped vibration-sensing gyro 10C, which accordingly stabilizes vibrations of each tine along the X axis and reduces off-set outputs of the detection signals.

The third tine 14a used for feed-back control detects excited vibrations of the first tine 14 along the X axis so as to maintain the excitation amplitude substantially constant. Such structure allows feed-back control of vibrations of the first tines 14 along the X axis based on the vibrations of the third tine 14a along the X axis, thus stabilizing the vibrations and improving the sensitivity of detection of the Coriolis force. When the Coriolis force-induced vibrations of the first and third tines 14 and 14a along the Y axis are propagated to the second and forth tines 16 and 16a to vibrate the second and forth tines 16 and 16a along the Y axis, the direction of vibrations of the second tine 16 can be inverted from that of the forth tine 16a. While the second tines 16 vibrates in the direction of +Y, the forth tine 16a vibrates in the direction of −Y. This compensates for disturbance other than the angular velocity and enhances the sensitivity of detection of the Coriolis force.

There may be many modifications, alterations, and changes without departing from the scope or spirit of essential characteristics of the invention. It is thus clearly understood that the above embodiment is only illustrative and not restrictive in any sense. Examples of further modification are given below.

In the above embodiment, the vibration-sensing gyro 10 is made of a light alloy plate like duralumin and piezoelectric elements are applied for excitation of the tine and detection of the vibrations. The vibration-sensing gyro 10 may, however, be formed by etching a single-quartz crystal plate (quartz crystal wafer). The vibration-sensing gyro 10 made of quartz crystal has smaller dimensions as l1=4 mm, w1=0.28 mm, t1=0.3 mm, l2=4.14 mm, w2=0.4 mm, and t2=0.3 mm. Since quartz crystal itself has piezoelectric effects, an excitation tine steadily vibrating along the X axis is provided with electrodes for exciting the tine along the X axis through the reverse piezoelectric effects of the quartz crystal. A detection tine detecting vibrations along the Y axis is provided with electrodes for detecting vibrations of the tine along the Y axis by means of the piezoelectric effects of the quartz crystal. The quartz crystal substrate has a modulus of direct elasticity in the direction of excitation slightly different from a modulus of direct elasticity in the direction of detection due to the orientation of the crystal. According to a preferable arrangement, the vibration-sensing gyro 10 has a specific structure described below for correcting such difference.

Equation (6) shown above can be rewritten as:

$$w1 = \sqrt{E1} \; /l1^2 = t2 \sqrt{E2} \; /l2^2$$

where E1 and E2 respectively denote the modulus of direct elasticity in the direction of excitation and the same in the direction of detection. The lengths l1 and l2, the width w1, and the thickness t2 of the tines are accordingly specified to satisfy this equation.

In the embodiment described above, the length l2 of the second tine 16 is greater than the length l1 of the first tine 14. As long as Equations (7) and (8) or Equation (6) can be satisfied, the lengths may be determined arbitrarily. For example, when the thickness of the vibration-sensing gyro 10 is 1.5 mm, half the value (3 mm) of the above embodiment, Equation (7) gives the length l2=√1.5/2.8×40=29.3 mm. Even when the length l2 of the second tine 16 is less than the length l1 of the first tine 14, this vibration-sensing gyro 10 fulfills the relations of Equations (7) and (8) or Equation (6) and thus realizes the above effects. In such a vibration-sensing gyro 10 having the smaller thickness, electrodes can be formed easily over the whole side faces of the excitation tine.

Although tines are aligned along the X axis in the above description, the X axis may be perpendicular to both the axis of alignment of tines and the longitudinal axis of the tines (Y axis in the above description). The Y axis is then determined to be perpendicular to the X axis.

As described above, in the vibration-sensing element of the invention, the value of the first ratio of the square root of the width w1 of the first tine along the X axis to the length l1 of the first tine coincides with the value of the second ratio of the square root of the thickness t2 of the second tine along the Y axis to the length l2 of the second tine. Specification and adjustment of the easily-measurable lengths, widths, and thicknesses of the first tine and the second tine allow the resonance frequency fy2 of the second tine along the Y axis to be easily made identical with the resonance frequency fx1 of the first tine along the X axis and thereby with the angular velocity frequency fyω1 of the first tine along the Y axis. Adjustment of the resonance frequencies of the respective tines can be implemented independently with less labor and time. The structure of the invention does not require the time-consuming mass regulation conventionally executed and thus simplifies the adjustment process of the resonance frequencies of the respective tines. The invention does not require any specific adjustment for making the resonance frequency fx1 of the first tine coincide with the resonance frequency fx2 of the second tine, thereby further simplifying the adjustment process of the resonance frequencies.

When an angular velocity acts around the Z axis perpendicular to the X-Y plane while the first tine vibrates along the X axis, the angular velocity-based Coriolis force causes vibrations of the first tine along the Y axis, which are subsequently propagated to the second tine. The second tine vibrates sympathetically along the Y axis at the resonance frequency fy2, which is equal to the resonance frequency fx1 of the first tine along the X axis and to the angular velocity frequency fyω1 of the first tine along the Y axis. The structure of the invention increases the amplitude of the Coriolis force-based vibrations of the second tine along the Y axis (amplitude of vibrations in the direction of detection) for the larger displacement of the second tine and accordingly enhances the sensitivity of detection of the Coriolis force without any special operation such as mass regulation. The vibration-sensing element of the invention can detect the Coriolis force with high sensitivity without requiring the time-consuming adjustment of resonance frequencies or mass regulation.

The resonance frequency fx1 of the first tine and the resonance frequency fy2 of the second tine are made identical with each other irrespective of the width w2 of the second tine along the X axis and the thickness t1 of the first tine along the Y axis. The resonance frequency fx2 of the second tine can thus be made equal to an antiresonance frequency of the first tine along the X axis by appropriately specifying the width w2 of the second tine along the X axis and the thickness t1 of the first tine along the Y axis. This effectively suppresses vibrations of the second tine along the X axis and realizes substantially unidirectional vibrations of the second tine along the Y axis. The structure of the invention preferably eliminates adverse effects of the vibrations of the second tine along the X axis which may disturb detection of the Coriolis force on the second tine, thereby enhancing the sensitivity of detection of the Coriolis force.

The scope and spirit of the present invention are limited only by the terms of the appended claims.

What is claimed:

1. A vibration-sensing element comprising:

a base;

first and second tines projecting from said base, said first and second tines being fixed to said base and arranged in a plane so that, while said first tine vibrates, vibrations are propagated from said first tine to said second tine through said base;

said first tine being formed to have a width w1 along an X axis of rectangular coordinate axis and arranged to allow vibrations along said X axis;

said second tine being formed to have a thickness t2, different from said width w1, along a Y axis perpendicular to said X axis, and arranged to allow vibrations along said Y axis; and wherein a resonance frequency of said first tine along said X axis coincides with a resonance frequency of said second tine along said Y axis, and a value of a first ratio of the square root of said width w1 of said first tine to a length l1 of said first tine coincides with a value of a second ratio of the square root of the thickness t2 of said second tine to a length l2 of said second tine, the length of the first tine l1 being measured from a fulcrum of vibrations of said first tine along said X axis to a free end and the length l2 of the second tine being measured from a fulcrum of vibrations of said second tine along said Y axis to a free end.

2. A vibration-sensing element in accordance with claim 1, wherein said vibration-sensing element is adjusted to coincide said value of said first ratio of said first tine with said value of the second ratio of said second tine by adjusting at least one of said width w1 of said first tine, said thickness t2 of said second tine, said length l1 of said first tine, and said length l2 of said second tine.

3. A vibration-sensing element in accordance with claim 1, wherein said first tine and said second tine are fixed to and projected from said base in such a manner that said length l1 of said first tine is made different from said length l2 of said second tine.

4. A vibration-sensing element in accordance with claim 3, wherein said first tine and said second tine are fixed to and projected from said base in such a manner that widths of said first tine and said second tine along said X axis are made different from each other and thicknesses of said first tine and said second tine along said Y axis are set identical with each other.

5. A vibration-sensing element in accordance with claim 1, wherein said first tine and said second tine are arranged parallel to each other.

6. A vibration-sensing element in accordance with claim 1, wherein a resonance frequency of said second tine along the X axis is made identical with an anti-resonance frequency of said first tine along the X axis by specifying a width w2 of said second tine along the X axis and a thickness t1 of said first tine along the Y axis.

7. A vibration-sensing element in accordance with claim 1, said vibration-sensing element further comprises a third tine fixed to and projecting from said base in such a manner that said third tine is arranged in the same said plane as said first tine and said second tine and the vibrations of said first tine are propagated to said third tine through said base;

wherein a resonance frequency of said third tine along said X axis coincides with said resonance frequency of said first tine along said X axis.

8. A vibration-sensing element in accordance with claim 1, said vibration-sensing element comprises a first tuning fork of said first tine and a second tuning fork of said second tine;

wherein said first tuning fork projects from said base in a first direction and said second tuning fork projects from said base in a second direction, which is opposite to said first direction.

9. A vibration-sensing element in accordance with claim 1, said vibration-sensing element comprises a first tuning fork of said first tine and a second tuning fork of said second tine;

wherein said first tuning fork is fixed to a bifurcated base of said second tuning fork.

10. A vibration-sensing element in accordance with claim 1, wherein said first tine, said second tine, and said base are composed of a quartz crystal;

said resonance frequency of said first tine along said X axis and said resonance frequency of said second tine along said Y axis are adjusted by making a first correction value, which is obtained by correcting a value of a first ratio of said first tine with a modulus of direct elasticity of said first tine along the X axis, coincide with a second correction value, which is obtained by correcting a value of a second ratio of said second tine with a modulus of direct elasticity of said second tine along the Y axis.

11. A vibration-sensing element in accordance with claim 7, wherein said vibration-sensing element comprises said first, said second and said third tines projecting from said base in a first direction and fourth, fifth and sixth tines projecting from said base in a second direction opposite to the first direction, said fourth, fifth and sixth tines having substantially the same structures as said first, second and third tines, respectively.

12. A vibration-sensing element in accordance with claim 1, wherein said vibration-sensing element comprises said first tine projecting from said base in a first direction and said second tine projecting from said base in a second direction opposite to the first direction.

13. A vibration-sensing element in accordance with claim 12, wherein said vibration-sensing element is formed in an H-shape which comprises said first tine and a third tine projecting from said base in a first direction and said second tine and a fourth tine projecting from said base in a second direction opposite to the first direction, said third and fourth tines having substantially the same structures as said first and second tines, respectively.

14. A method of adjusting a resonance frequency of a vibration-sensing element having a base and first and second tines projecting from said base, said first and second tines being fixed to said base and arranged in a plane so that, while said first tine vibrates, vibrations are propagated from said first tine to said second tine through said base, said first tine being formed to have a width w1 along an X axis of rectangular coordinate axis and arranged to allow vibrations along said X axis, said second tine being formed to have a thickness t2, different from said width w1, along a Y axis perpendicular to said X axis, and arranged to allow vibrations along said Y axis, wherein a resonance frequency of said first tine along said X axis coincides with a resonance frequency of said second tine along said Y axis, and a value of a first ratio of the square root of said width w1 of said first tine to a length l1 of said first tine coincides with a value of a second ratio of the square root of the thickness t2 of said second tine to a length l2 of said second tine, the length of the first tine l1 being measured from a fulcrum of vibrations of said first tine along said X axis to a free end and the length l2 of the second tine being measured from a fulcrum of vibrations of said second tine along said Y axis to a free end, said method comprising the steps of:

(a) adjusting at least one of said width w1 of said first tine and said thickness t2 of said second tine to make said value of said first ratio of said first tine and said value of said second ratio of said second tine equal to each other.

15. A method of adjusting in accordance with claim 14, wherein said step (a) comprises a step of adjusting said width w1 of said first tine and said thickness t2 of said second tine through thin-film formation process.

16. A vibration-sensing gyro comprising:

a vibration-sensing element which includes
  a base;
  first and second tines projecting from said base, said first and second tines being fixed to said base and arranged in a plane so that, while said first tine vibrates, vibrations are propagated from said first tine to said second tine through said base;
  said first line being formed to have a width w1 along an X axis of rectangular coordinate axis and arranged to allow vibrations along said X axis;
  said second tine being formed to have a thickness t2, different from said width w1, along a Y axis perpendicular to said X axis, and arranged to allow vibrations along said Y axis; and
  wherein a resonance frequency of said first tine along said X axis coincides with a resonance frequency of said second tine along said Y axis, and a value of a first ratio of the square root of said width w1 of said first tine to a length l1 of said first tine coincides with a value of a second ratio of the square root of the thickness t2 of said second tine to a length l2 of said second line, the length of the first tine l1 being measured from a fulcrum of vibrations of said first tine along said X axis to a free end and the length l2 of the second tine being measured from a fulcrum of vibrations of said second tine along said Y axis to a free end;

first excitation means disposed on said first tine for vibrating said first tine along the X axis; and first detection means disposed on said second tine for detecting vibrations of said second tine along the Y axis.

17. A vibration-sensing gyro in accordance with claim 16, wherein said vibration-sensing element is composed of a metal plate;

said first excitation means comprises a piezoelectric element mounted close to said fulcrum of said vibrations of said first tine;

said first detection means comprises a piezoelectric element mounted close to said fulcrum of said vibrations of said second tine.

18. A vibration-sensing gyro in accordance with claim 16, wherein said vibration-sensing element is composed of a quartz crystal;

said first excitation means comprising an excitation electrode mounted on said first tine for vibrating said first tine along the X axis;

said first detection means comprises a detection electrode mounted on said second tine for detection vibrations of said second tine along the Y axis.

19. A vibration-sensing gyro in accordance with claim 16, further comprising:

a third tine fixed to and projecting from said base in such a manner that said third tine is arranged in the same said plane as said first tine and said second tine and the vibrations of said first tine are propagated to said third tine through said base, wherein a resonance frequency of said third tine along said X axis coincides with said resonance frequency of said first tine along said X axis;

feed-back detection means disposed on said third tine for detecting vibrations of said third tine along the X axis; and feed-back control means for executing feed-back control of said first excitation means in response to the detection of the vibration s by said feed-back detection means.

20. A vibration-sensing gyro in accordance with claim 16, further comprising:

the vibration-sensing element is formed in an H-shape which comprises said first tine and a third tine projecting from said base in a first direction and said second tine and a fourth tine projecting from said base in a second direction opposite to the first direction, said third and fourth tines having substantially the same structures as said first and second tines, respectively;

second excitation means disposed on said third tine for harmonically vibrating said third tine in either of an equiphase and in an antiphase with respect to the vibrations of said first tine; and second detection means disposed on said fourth line for detecting vibrations of said fourth tine along the Y axis.

21. A method of detecting a yaw rate observed in a vehicle having a longitudinal axis and a lateral axis, said method comprising the steps of:

(a) mourning a vibration-sensing gyro on the vehicle in such a manner that an X-Y plane of said gyro coincides with a plane formed by the longitudinal axis of said vehicle and the lateral axis of said vehicle, said vibration-sensing gyro including (i) a vibration-sensing element having
  a base;
  first and second tines projecting from said base, said first and second tines being fixed to said base and arranged in a plane so that, while said first tine vibrates, vibrations are propagated from said first tine to said second tine through said base; said first tine being formed to have a width w1 along an X axis of rectangular coordinate axis and arranged to allow vibrations along said X axis;
  said second tine being formed to have a thickness t2, different from said width w1, along a Y axis perpendicular to said X axis, and arranged to allow vibrations along said Y axis; and wherein a resonance frequency of said first tine along said X axis coincides with a resonance frequency of said second line along said Y axis, and a value of a first ratio of the square root of said width w1 of said first line to a length l1 of said first line coincides with a value of a second ratio of the square root of the thickness t2 of said second tine to a length l2 of said second line, the length of the first tine l1 being measured from a fulcrum of vibrations of said first tine along said X axis to a free end and the length l2 of the second tine being measured from a fulcrum of vibrations of said second tine along said Y axis to a free end;

(ii) first excitation means disposed on said first tine for vibrating said first line along the X axis; and (iii) first detection means disposed on said second tine for detecting vibrations of said second tine along the Y axis;

(b) outputting an excitation signal to said first excitation means of the vibration-sensing gyro mounted on the vehicle to vibrate said first tine along the X axis; and (c) receiving results of detection by said first detection means of said vibration-sensing gyro and calculating the yaw rate based on the results of detection.

22. A method of detecting a yaw rate in accordance with claim 21, wherein:

said first excitation means comprises a piezoelectric element mounted close to a fulcrum of said vibrations of said first tine;

said first detection means comprises a piezoelectric element mounted close to a fulcrum of said vibrations of said second tine; and said vibration-sensing element is composed of a metal plate.

23. A method of detecting a yaw rate observed in a vehicle in accordance with claim 21, wherein:

said vibration-sensing element is composed of a quartz crystal;

said first excitation means comprises an excitation electrode mounted on said first tine for vibrating said first line along the X axis; and said first detection means comprises a detection electrode mounted on said second tine for detecting vibrations of said second line along the Y axis.

* * * * *

UNITED STATES PATENT AND TRADEMARK OFFICE
CERTIFICATE OF CORRECTION

PATENT NO. : 5,533,397
DATED : 9 July 1996
INVENTOR(S) : Nobuyoshi SUGITANI et al.

It is certified that error appears in the above-indentified patent and that said Letters Patent is hereby corrected as shown below:

| Column | Line | |
|---|---|---|
| 11 | 36 | Change "long" to --along--. |
| 14 | 10 | Change "line" to --tine--. |
| 17 | 1 | Change "line" to --tine--. |
| 17 | 29 | Change "line" to --tine--. |
| 17 | 32 | Change "line" to --tine--. |
| 18 | 4 | Change "line" to --tine--. |

Signed and Sealed this

Seventh Day of January, 1997

Attest:

BRUCE LEHMAN

Attesting Officer     Commissioner of Patents and Trademarks